US010869547B2

(12) United States Patent
Lu

(10) Patent No.: US 10,869,547 B2
(45) Date of Patent: Dec. 22, 2020

(54) HEIGHT-ADJUSTABLE TABLE WITH TABLETOP TOUCH CONTROL

(71) Applicant: Dong Guan Song Wei Electric Technology Co., Ltd., Dongguan (CN)

(72) Inventor: Weilin Lu, Dongguan (CN)

(73) Assignee: DONG GUAN SONG WEI ELECTRIC TECHNOLOGY CO., LTD., Dongguan (CN)

( * ) Notice: Subject to any disclaimer, the term of this patent is extended or adjusted under 35 U.S.C. 154(b) by 49 days.

(21) Appl. No.: 16/226,636

(22) Filed: Dec. 20, 2018

(65) Prior Publication Data

US 2020/0196747 A1 Jun. 25, 2020

(51) Int. Cl.
A47B 9/00 (2006.01)
G06F 3/041 (2006.01)
A47B 1/08 (2006.01)

(52) U.S. Cl.
CPC .......... *A47B 9/00* (2013.01); *A47B 1/08* (2013.01); *G06F 3/041* (2013.01); *A47B 2200/008* (2013.01)

(58) Field of Classification Search
CPC ....... A47B 9/00; A47B 9/16; A47B 2200/008; A47B 1/08; G06F 3/041
See application file for complete search history.

(56) References Cited

U.S. PATENT DOCUMENTS

| 7,920,125 | B2* | 4/2011 | Imamura | G06F 1/1616 |
| | | | | 108/23 |
| 2008/0289544 | A1* | 11/2008 | Buitmann | A47B 9/00 |
| | | | | 108/20 |
| 2013/0204438 | A1* | 8/2013 | Hjelm | A47B 9/00 |
| | | | | 700/275 |
| 2014/0299025 | A1* | 10/2014 | Moita Gorgulho Soares Branco | A47B 21/007 |
| | | | | 108/50.02 |
| 2018/0279770 | A1* | 10/2018 | Crowe | A47B 9/16 |
| 2019/0125075 | A1* | 5/2019 | Soulliere | G06F 1/20 |

* cited by examiner

*Primary Examiner* — Matthew W Ing
(74) *Attorney, Agent, or Firm* — Leong C. Lei

(57) ABSTRACT

A height-adjustable table with tabletop touch control includes a table frame, a motor unit, a tabletop, a controller, a touch button box, and a covering. Through the touch button box connected to the controller in cooperation with the controller to control the motor unit, the motor unit drives the table frame to move up and down to achieve the lifting and lowering of the tabletop. The user can adjust the height of the tabletop by simply manipulating the touch button box. The adjustment is more convenient.

8 Claims, 7 Drawing Sheets

HEIGHT-ADJUSTABLE TABLE WITH TABLETOP TOUCH CONTROL

BACKGROUND OF THE INVENTION

1. Field of the Invention

The present invention relates to a table, and more particularly to a height-adjustable table with tabletop touch control.

2. Description of the Prior Art

Tables are widely used in our daily life for eating, working, etc. In general, a table structure mainly includes table legs and a tabletop disposed on the table legs. Most of the tables are placed directly on the ground. The height of the table cannot be adjusted according to the needs of the user. Although there are some tables that can be adjusted in height on the market. Most of tables are adjusted manually. The height adjustment is inconvenient, time-consuming and laborious. The tables have a single function, which cannot meet the needs of use. Therefore, it is necessary to improve the conventional table.

SUMMARY OF THE INVENTION

In view of the drawbacks of the prior art, the primary object of the present invention is to provide a height-adjustable table with tabletop touch control, which can effectively solve the problem that the conventional table is inconvenient for height adjustment and has a single function.

In order to achieve the above object, the present invention adopts the following technical solutions:

A height-adjustable table with tabletop touch control comprises a table frame, a motor unit, a tabletop, a controller, a touch button box, and a covering. The table frame is a table frame that can be extended and retracted up and down. The motor unit is disposed on the table frame and configured to drive the table frame to move up and down. The tabletop is disposed on top of the table frame to move up and down with the table frame. An upper surface of the tabletop is provided with a recess. The controller is connected to the motor unit. The touch button box is embedded in the recess. The touch button box is connected to the controller. A top of the touch button box is flush with the upper surface of the tabletop. The covering is configured to cover the upper surface of the tabletop and the touch button box. The covering is provided with a functional pattern layer corresponding in position to an operable area of the touch button box.

Compared with the prior art, the present invention has obvious advantages and beneficial effects. Specifically, it can be known from the above technical solutions:

Through the touch button box connected to the controller in cooperation with the controller to control the motor unit, the motor unit drives the table frame to move up and down to achieve the lifting and lowering of the tabletop. The user can adjust the height of the tabletop by simply manipulating the touch button box, instead of the traditional manual adjustment. The adjustment is more convenient and saves time and labor. The structure of the product is simple and stable, and the functions are diverse, meeting the needs of use. Besides, the tabletop is more beautiful by embedding the touch button box in the recess to be flush with the upper surface of the tabletop and by providing the covering to cover the touch button box.

DETAILED DESCRIPTION OF THE PREFERRED EMBODIMENTS

Figure 1:
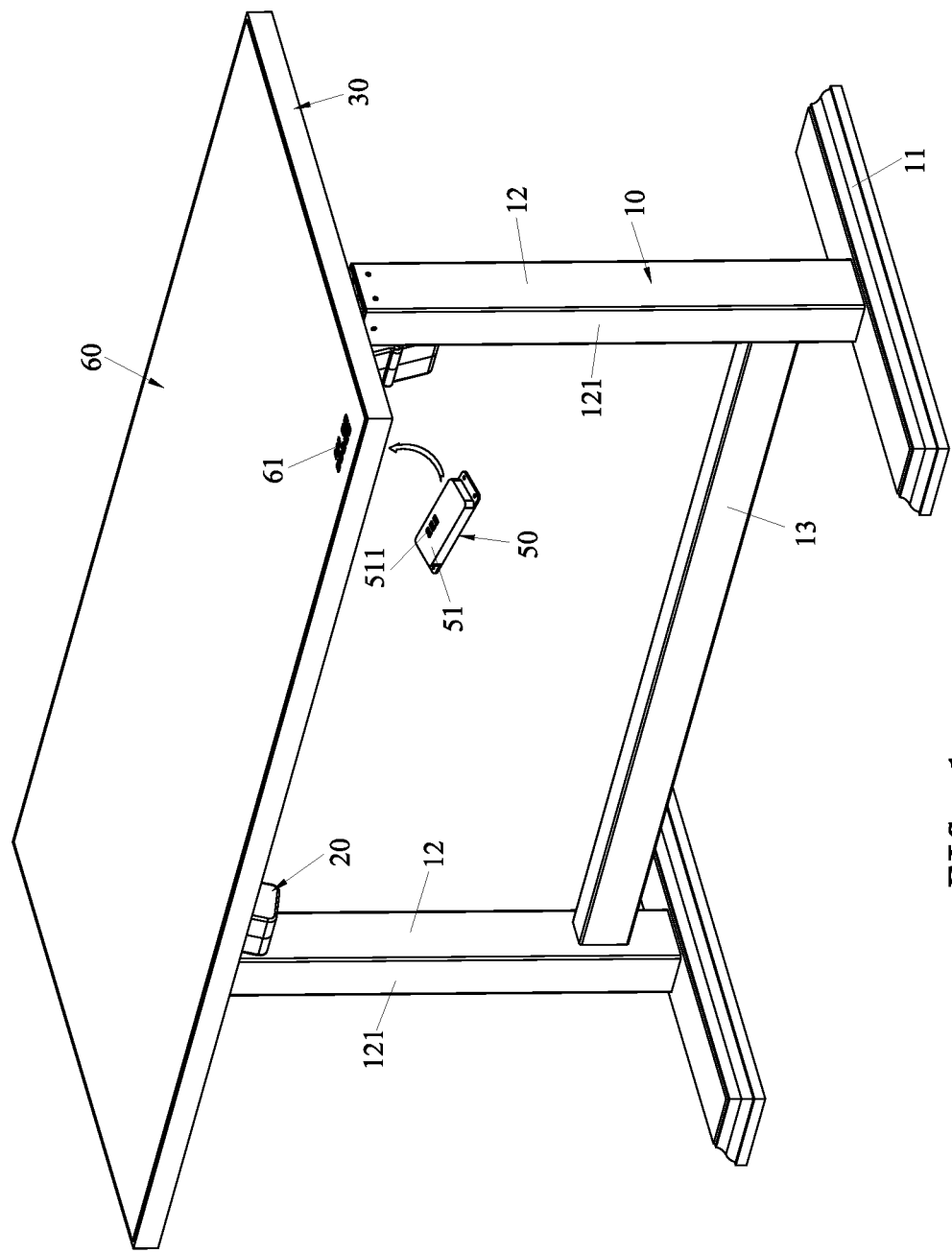
FIG. 1 is a perspective view according to a preferred embodiment of the present invention.
Figure 2:
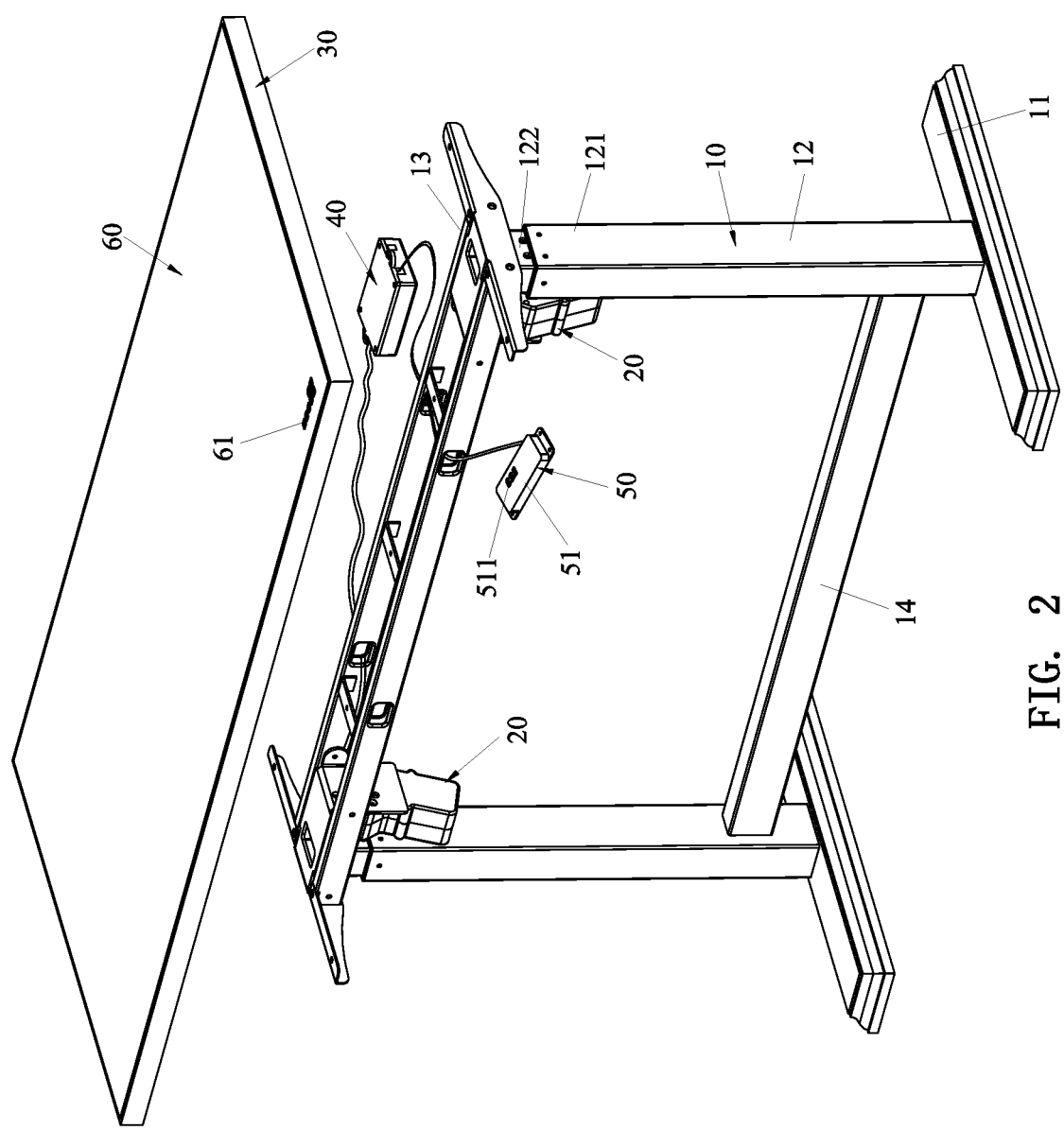
FIG. 2 is an exploded view according to the preferred embodiment of the present invention.

Embodiments of the present invention will now be described, by way of example only, with reference to the accompanying drawings.

Referring to FIG. 1 to FIG. 6, a height-adjustable table with tabletop touch control in accordance with a preferred embodiment of the present invention comprises a table frame 10, a motor unit 20, a tabletop 30, a controller 40, a touch button box 50, and a covering 60.

The table frame 10 is a table frame that can be extended and retracted up and down. The motor unit 20 is disposed on the table frame 10 and configured to drive the table frame 10 to move up and down. In this embodiment, the table frame 10 includes a base 11, at least two height-adjustable table legs 12 and a retaining frame 13. The table legs 12 are spaced apart and arranged vertically. Each of the table legs 12 includes an immovable outer tube 121 and a movable inner tube 122. A lower end of the immovable outer tube 121 is fixed to the base 11. The movable inner tube 122 can be moved up and down and is disposed in the immovable outer tube 121. An upper end of the movable inner tube 122 extends out of the immovable outer tube 121. The motor unit 20 drives the movable inner tube 122 to move up and down. The retaining frame 13 is fixedly connected to the upper end of the movable inner tube 122 of each of the table legs 12. The number of the table legs 12 is two. The two table legs 12 are linked and controlled by a transmission rod, or the two table legs 12 are independent of each other. Correspondingly, the motor unit 20 may include one or two motor units. The motor unit 20 drives the movable inner tubes 122 of the table legs 20 to move up and down. In this embodiment, the two table legs 12 are independent of each other, and correspondingly, the number of the motor units 20 is two, but not limited thereto. The base 11 includes a left base and a right base. The two table legs 12 are vertically disposed on the left and right bases 11, respectively. A connecting rod 14 is connected between the immovable outer tubes 121 of the two table legs 12.

The tabletop 30 is disposed on top of the table frame 10 to move up and down with the table frame 10. An upper surface of the tabletop 30 is provided with a recess 31. In this embodiment, the tabletop 30 is disposed on top of the retaining frame 13 and fixedly connected to the retaining frame 13. The recess 31 is located at the lower right corner of the tabletop 30.

Figure 3:
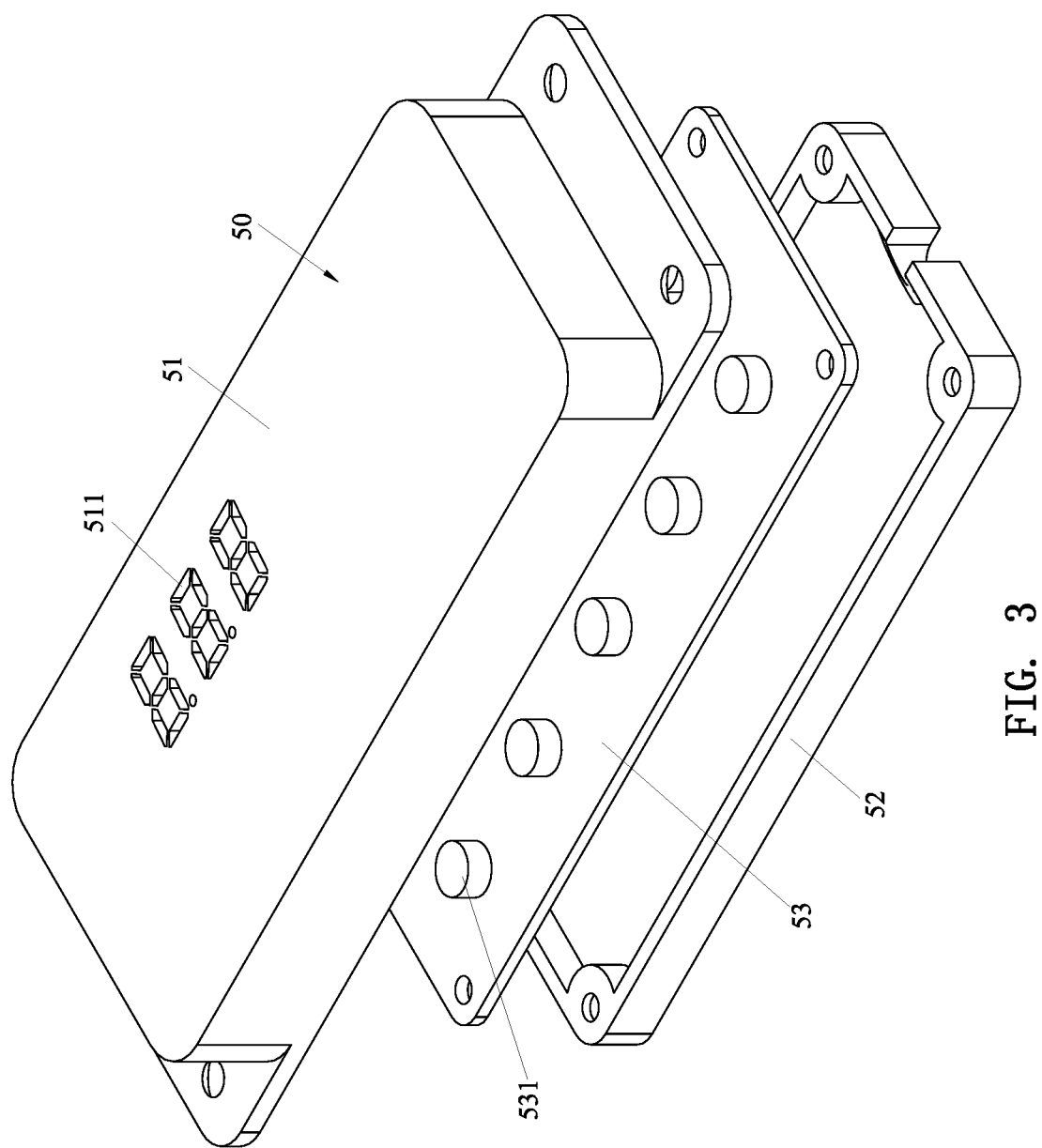
FIG. 3 is an exploded view of the touch button box according to the preferred embodiment of the present invention.
Figure 4:
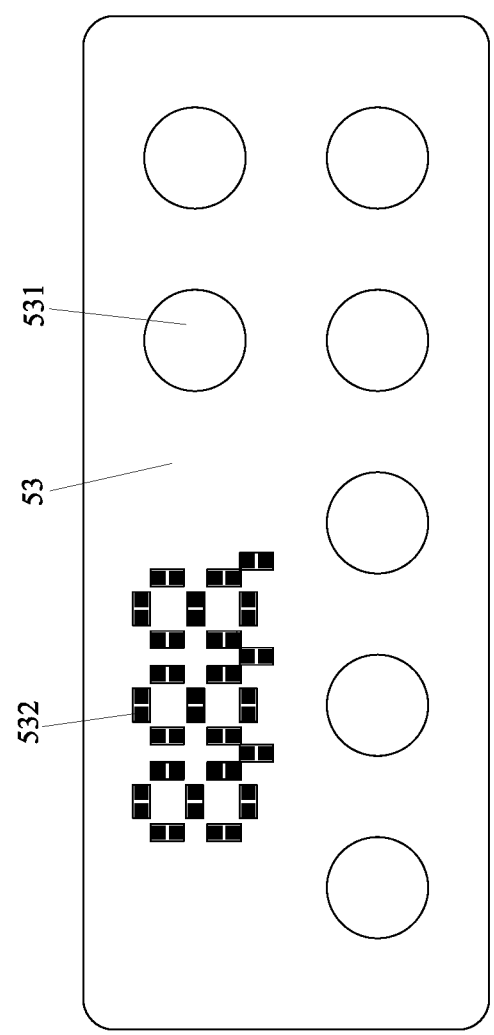
FIG. 4 is a front view of the button board according to the preferred embodiment of the present invention.
Figure 5:
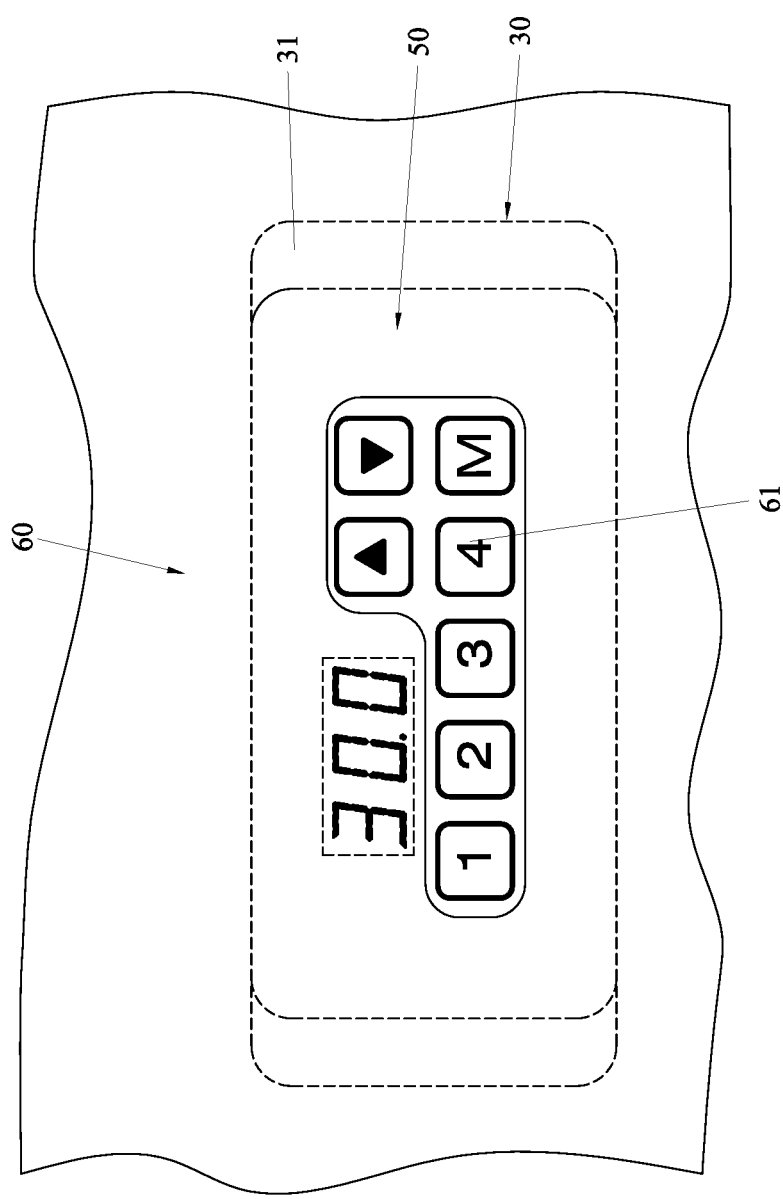
FIG. 5 is a top view of the touch button box after installed according to the preferred embodiment of the present invention.
Figure 6:
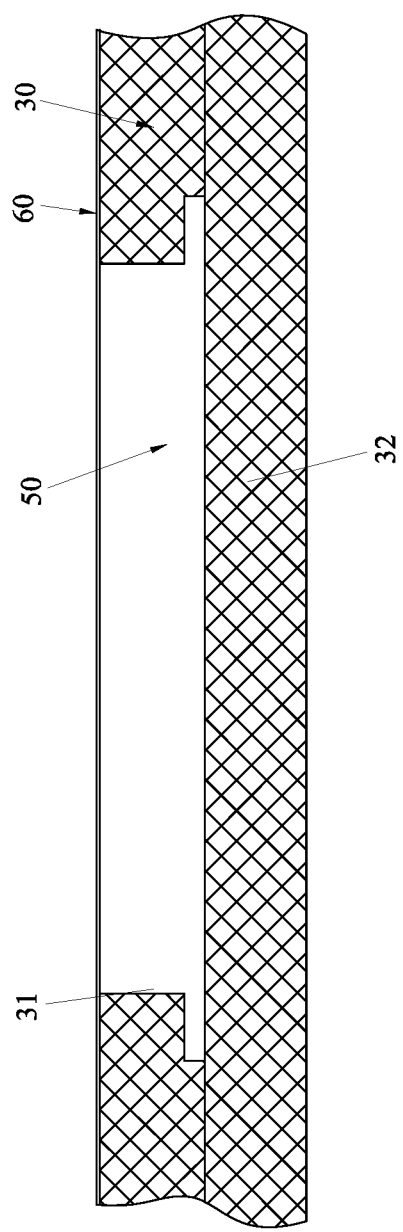
FIG. 6 is a cross-sectional view of the touch button box after installed according to the preferred embodiment of the present invention.

The controller 40 is connected to the motor unit 20. The touch button box 50 is embedded in the recess 31. The touch button box 50 is connected to the controller 40. The top of the touch button box 50 is flush with the upper surface of the tabletop 30. Specifically, as shown in FIG. 3, the touch button box 50 includes an upper casing 51, a lower casing 52, and a button board 53. The lower casing 52 and the upper casing 51 are assembled and fixed together. The button board 53 is sandwiched between the upper casing 51 and the lower casing 52. The button board 53 has a plurality of touch buttons 531 and a plurality of LED units 532. Each LED unit 532 has light-emitting diodes arranged in an "8" shape. A plurality of "8"-shaped apertures 511 are defined in the upper casing 51. The plurality of LED units 532 face the corresponding "8"-shaped apertures 511, respectively. A lower surface of the tabletop 30 is provided with a cover 32 to cover the bottom of the touch button box 50. The material of the cover 32 is the same as that of the tabletop 30. In this way, the button board 53 won't be seen from the appearance, which is more beautiful and practical.

The covering 60 covers the upper surface of the tabletop 30 and the touch button box 50. The covering 60 is provided with a functional pattern layer 61 corresponding in position to an operable area of the touch button box 50. In this embodiment, the functional pattern layer 61 is located above the plurality of touch buttons 531. The functional pattern layer 61 and the plurality of touch buttons 531 correspond to each other. The covering 60 is a glass, fabric or wooden ornament. The functional pattern layer 61 is formed on the surface of the covering 60 by printing or engraving.

The working principle of this embodiment is as follows:

In use, the touch button box 50 can be triggered by manually touching a corresponding icon on the functional pattern layer 61, so that the controller 40 controls the motor unit 20 to work. The motor unit 20 works to drive the movable inner tube 122 to move up and down, so that the height of the tabletop 30 is adjusted accordingly.

When the table is actuated, through the control of the controller 40 and the button board 53, the preset LED units 532 on the button board 53 light up the LEDs representing different numbers or codes. The light of the LEDs illuminates the covering 60 on the tabletop 30 via the apertures 511 of the upper casing 51 of the touch button box 50. Thus, a clear number or code can be seen on the covering 60 on top of the tabletop 30. When the table is not operated, the display of the number or code will disappear automatically. In this way, the covering 60 on the tabletop 30 is seamless, without any damage to the covering 60, so that the tabletop 30 is very aesthetically pleasing.

Figure 7:
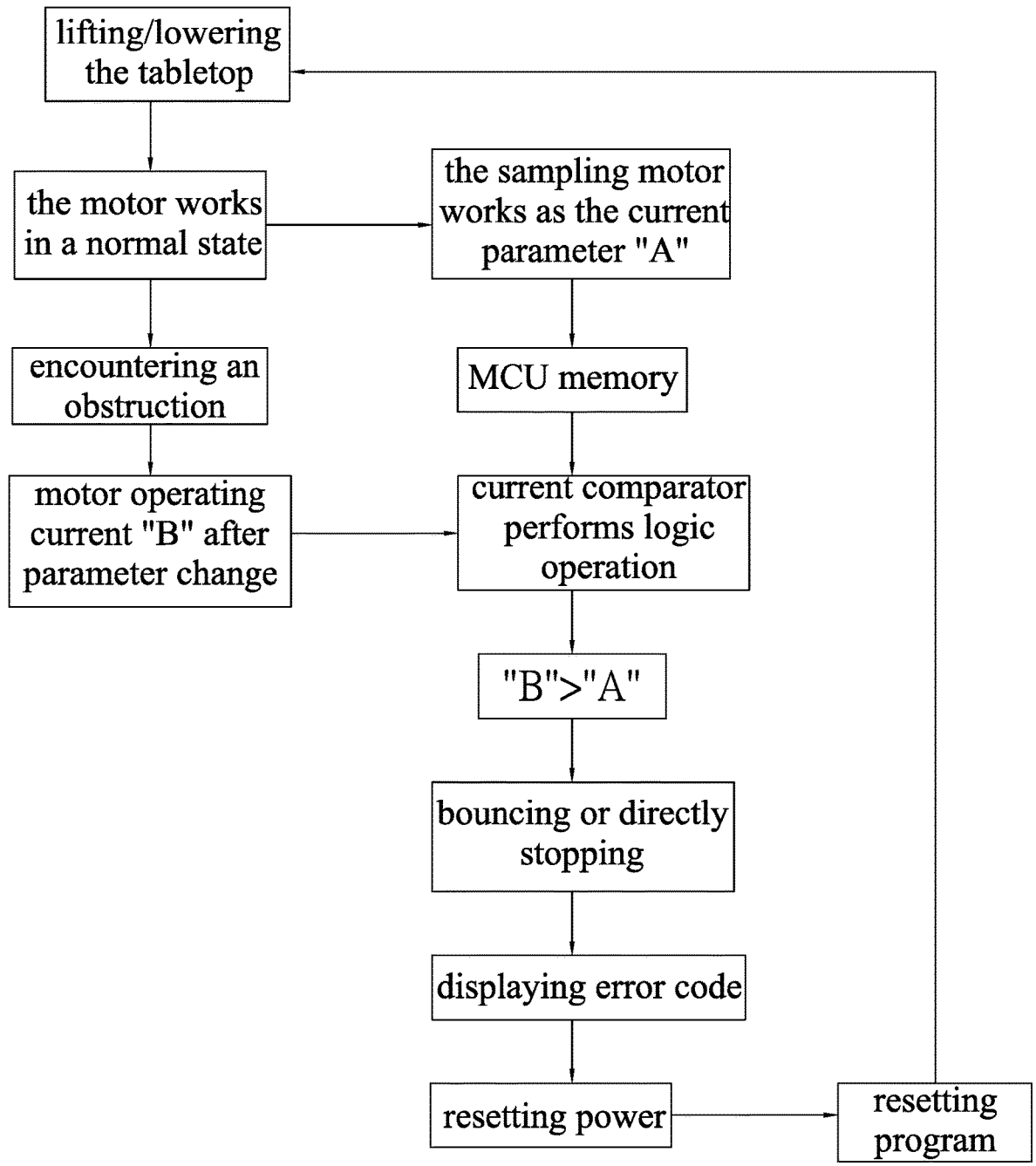
FIG. 7 is a flow chart showing the control flow of the preferred embodiment of the present invention.

For the table to be used safer, the controller 40 is provided with a program for obstruction-resistant protection. A current sampler, a current comparator and a microprogrammed control unit (MCU) are disposed on a control board in the controller 40 for controlling a logic operation program. When the tabletop 30 encounters an obstruction during the process of lifting or lowering, the table will bounce or stop lifting or lowering automatically. The specific control implementation method is shown in FIG. 7.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A height-adjustable table with tabletop touch control, comprising a table frame, a motor unit, a tabletop, a controller, a touch button box, and a covering; the table frame being a table frame that can be extended and retracted up and down; the motor unit being disposed on the table frame and configured to drive the table frame to move up and down; the tabletop being disposed on top of the table frame to move up and down with the table frame, an upper surface of the tabletop being provided with a recess; the controller being connected to the motor unit; the touch button box being embedded in the recess, the touch button box being connected to the controller, a top of the touch button box being flush with the upper surface of the tabletop; the covering being configured to cover the upper surface of the tabletop and the touch button box, the covering being provided with a functional pattern layer corresponding in positon to an operable area of the touch button box; wherein the touch button box includes an upper casing, a lower casing and a button board, the lower casing and the upper casing are assembled and fixed together, the button board is sandwiched between the upper casing and the lower casing, button board has a plurality of touch buttons and a plurality of LED units; the functional pattern layer is located above the plurality of touch buttons, the functional pattern layer and the plurality of touch buttons correspond to each other; the LED units each have light-emitting diodes arranged in an "8" shape, a plurality of "8"-shaped apertures are defined in the upper casing, and the plurality of LED units face the corresponding "8"-shaped apertures, respectively.

2. The height-adjustable table with tabletop touch control as claimed in claim 1, wherein a lower surface of the tabletop is provided with a cover to cover a bottom of the touch button box.

3. The height-adjustable table with tabletop touch control as claimed in claim 1, wherein the covering is a glass, fabric or wooden ornament.

4. The height-adjustable table with tabletop touch control as claimed in claim 1, wherein the functional pattern layer is formed on a surface of the covering by printing or engraving.

5. The height-adjustable table with tabletop touch control as claimed in claim 1, wherein the table frame includes a base, at least two height-adjustable table legs and a retaining frame; the table legs are spaced apart and arranged vertically, each of the table legs includes an immovable outer tube and a movable inner tube, a lower end of the immovable outer tube is fixed to the base, the movable inner tube is movably disposed in the immovable outer tube, an upper end of the movable inner tube extends out of the immovable outer tube, the motor unit drives the movable inner tube to move up and down; the retaining frame is fixedly connected to the upper end of the movable inner tube of each of the table legs.

6. The height-adjustable table with tabletop touch control as claimed in claim 5, wherein the number of the table legs is two, the two table legs are linked and controlled by a transmission rod or the two table legs are independent of each other, the motor unit includes one or two motor units, and the motor unit drives the movable inner tubes of the table legs to move up and down.

7. The height-adjustable table with tabletop touch control as claimed in claim 6, wherein the base includes a left base and a right base, the two table legs are vertically disposed on the left and right bases respectively, and a connecting rod is connected between the immovable outer tubes of the two table legs.

8. The height-adjustable table with tabletop touch control as claimed in claim 1, wherein the controller is provided with a program for obstruction-resistant protection, an a control board in the controller is provided with a current sampler, a current comparator and a microprogrammed control unit (MCU) for controlling a logic operation program.

* * * * *